(12) United States Patent
Luo et al.

(10) Patent No.: US 11,063,969 B1
(45) Date of Patent: Jul. 13, 2021

(54) DETECTION OF PERIODIC TRANSMISSIONS FOR IDENTIFYING MALICIOUS COMPUTERS

(71) Applicant: Trend Micro Incorporated, Tokyo (JP)

(72) Inventors: Shoufu Luo, Austin, TX (US); Jonathan Edward Andersson, Round Rock, TX (US); Josiah Dede Hagen, Round Rock, TX (US)

(73) Assignee: Trend Micro Incorporated, Tokyo (JP)

( * ) Notice: Subject to any disclaimer, the term of this patent is extended or adjusted under 35 U.S.C. 154(b) by 238 days.

(21) Appl. No.: 16/451,332

(22) Filed: Jun. 25, 2019

Related U.S. Application Data

(60) Provisional application No. 62/832,522, filed on Apr. 11, 2019.

(51) Int. Cl.
   *H04L 29/06* (2006.01)
   *G06F 16/901* (2019.01)

(52) U.S. Cl.
   CPC ...... *H04L 63/1425* (2013.01); *G06F 16/9024* (2019.01); *H04L 63/0209* (2013.01); *H04L 63/10* (2013.01); *H04L 63/145* (2013.01); *H04L 63/20* (2013.01); *H04L 2463/121* (2013.01)

(58) Field of Classification Search
   CPC . H04L 63/1425; H04L 63/0209; H04L 63/10; H04L 63/145; H04L 63/20; G06F 16/9024

USPC .......................................................... 726/11
See application file for complete search history.

(56) References Cited

U.S. PATENT DOCUMENTS

| | | | |
|---|---|---|---|
| 9,591,007 B2* | 3/2017 | Hu | ............. H04L 63/1416 |
| 10,204,214 B2* | 2/2019 | Reed | ............... G06F 21/561 |
| 2019/0246395 A1 | 8/2019 | Huang et al. | |
| 2019/0246420 A1 | 8/2019 | Park et al. | |
| 2019/0246422 A1 | 8/2019 | Luo et al. | |
| 2019/0261414 A1 | 8/2019 | Ron et al. | |
| 2019/0268739 A1 | 8/2019 | Caiou et al. | |
| 2019/0274560 A1 | 9/2019 | Zalevsky et al. | |
| 2019/0278749 A1 | 9/2019 | Yoakley et al. | |
| 2019/0281619 A1 | 9/2019 | Lee et al. | |

\* cited by examiner

*Primary Examiner* — Longbit Chai
(74) *Attorney, Agent, or Firm* — Okamoto & Benedicto LLP

(57) ABSTRACT

In one embodiment, a network security device monitors network communications between a computer and another computer. A periodicity of transmissions made by one computer to the other computer is determined, with the periodicity being used to identify candidate time point pairs having intervals that match the periodicity. A graph is constructed with time points of the candidate time point pairs as nodes and with intervals of time point pairs as edges. A longest path that continuously links one time point to another time point on the graph is compared to a threshold length to verify that the transmissions are periodic, and are thus potentially indicative of malicious network communications.

8 Claims, 7 Drawing Sheets

DETECTION OF PERIODIC TRANSMISSIONS FOR IDENTIFYING MALICIOUS COMPUTERS

CROSS-REFERENCE TO RELATED APPLICATION

This application claims the benefit of U.S. Provisional Application No. 62/832,522, filed on Apr. 11, 2019, which is incorporated herein by reference in its entirety.

BACKGROUND OF THE INVENTION

1. Field of the Invention

The present invention relates generally to computer network security, and more particularly but not exclusively to detection of malicious network communications.

2. Description of the Background Art

Computers that are infected with malware have been found to send beaconing signals to associated command and control (C2) servers. More particularly, malware may periodically connect back to its C2 server so that the cybercriminal can exercise control over the malware. One way of detecting periodic transmissions is to employ a signal processing algorithm to estimate the periodicity of the transmissions, followed by a statistics-based algorithm to verify that the transmissions are indeed periodic. The periodicity estimation step produces high true positives, but also high false positives. The verification step does not effectively filter out false positives. Additionally, this approach is not very effective in the presence of noise, failing to identify true periodic events that are slightly perturbed by erratic latencies.

Embodiments of the present invention advance the state-of-the-art in computer network security by providing a robust system and method for detecting periodic transmissions indicative of malicious network communications.

SUMMARY

In one embodiment, a network security device monitors network communications between a computer and another computer. A periodicity of transmissions made by the computer to the other computer is determined, with the periodicity being used to identify candidate time point pairs having intervals that match the periodicity. A graph is constructed with time points of the candidate time point pairs as nodes and with intervals of time point pairs as edges. A longest path that continuously links one time point to another time point on the graph is compared to a threshold length to increase confidence that the transmissions are periodic, and are thus potentially indicative of malicious network communications.

These and other features of the present invention will be readily apparent to persons of ordinary skill in the art upon reading the entirety of this disclosure, which includes the accompanying drawings and claims.

DESCRIPTION OF THE DRAWINGS

FIGS. 7 and 8 show example timestamps that have been collected in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
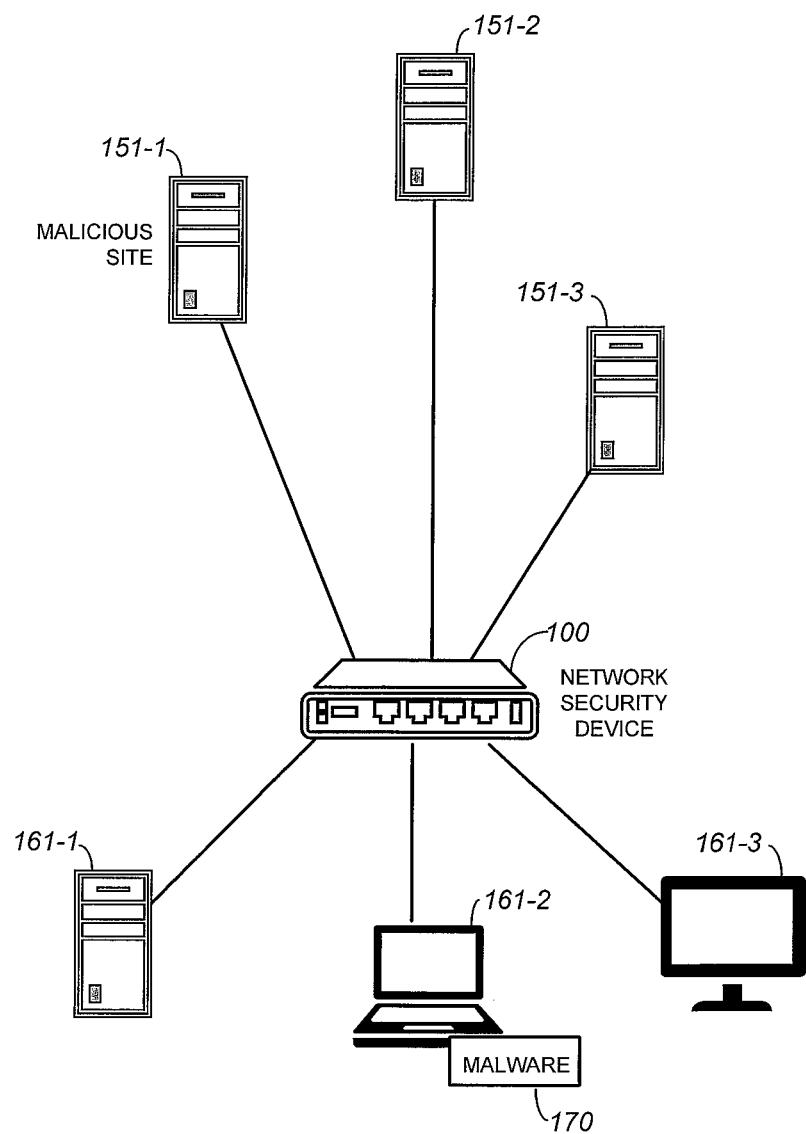
FIG. 1 shows a logical diagram of a system for detecting malicious network communications in accordance with an embodiment of the present invention.

FIG. 1 shows a logical diagram of a system for detecting malicious network communications in accordance with an embodiment of the present invention.

In the example of FIG. 1, computers 161 (i.e., 161-1, 161-2, 161-3, . . . ) may be computers of a private computer network, whereas computers 151 (i.e., 151-1, 151-2, 151-3, . . . ) may be computers that are untrusted. The network security device 100 may be configured to receive all network communications between the computers 161 and the computers 151. The network security device 100 may perform monitoring of network communications in-line, offline by receiving or scanning connection logs available from other computers, and/or by simply eavesdropping on the network communications. The network security device 100 may be implemented as a network appliance, a server computer, or other computing device.

In the example of FIG. 1, the computer 151-1 is a malicious site that is a C2 server of a malware 170 that has infected the computer 161-2. The malware 170 may periodically transmit data to the computer 151-1 to signal availability, to receive further instructions, to transfer stolen information, and for other reasons. The periodic transmissions made by the malware 170 to the computer 151-1 are also referred to as "beaconing signals." The malware 170 and/or the computer 151-1 may easily add noise to the timing and content of their network communications to prevent detection of the beaconing signals. The noise may be generated by performing communications for purposes other than beaconing, such as by transmitting junk (i.e., meaningless) packets, for example. The inventors realized that simply estimating periodicity of transmissions followed by statistics-based verification is not reliable in detecting periodic transmissions, especially in the presence of noise. This prior approach may result in low detection rate. As a particular example, in security systems where an alert is sent when a periodic transmission is detected, the prior approach will fail to detect many periodic transmissions where noise is present.

In the example of FIG. 1, the network security device 100 is configured to monitor network communications between two computers, collect timestamps of transmissions between the two computers, to estimate a periodicity of the transmissions, to identify candidate time point pairs with intervals that match the estimated periodicity, to construct a graph that has time points of candidate time point pairs as nodes and intervals of candidate time point pairs as edges, to find from the graph the longest path that continuously links one time point to another, to compare the longest path to a threshold length, and to detect that the transmissions between the two computers are periodic when the longest path is longer than the threshold length.

The initial periodicity determination made by the network security device 100 is an "estimate" in that the determined periodicity is not necessarily correct and the transmissions may not even be periodic. Variation in the estimation is allowed in the form of a delta threshold to compensate for possible errors in the periodicity estimation step. The path-finding approach involving the graph advantageously allows verification of the estimated periodicity in a robust manner, even in the presence of noise. The longest path being longer than the threshold length verifies that the transmissions are indeed periodic, and are potentially indicative of malicious communications. The network communications between the two hosts may thus be deemed as malicious based at least on detecting the periodic transmission between the two hosts.

The response action may involve raising an alert, such as notifying an administrator or other security device. The alert may initiate further investigation on at least one of the hosts, such as by performing an antivirus scan on the host, performing a web reputation analysis on at least one of the hosts, etc. Depending on the security posture of the system, the response action may include blocking communications from the hosts. Hosts that have been deemed to be malicious may be put on a black list.

As a particular example, the network security device 100 may monitor network communications between the computer 151-1 and the computer 161-2, detect that the computer 161-2 periodically transmits data to the computer 151-1, and alert an administrator in response to detecting that the transmissions made by the computer 161-2 to the computer 151-1 are periodic and, accordingly, are potentially indicative of malicious communications. The administrator may perform additional investigations and subsequently block network communications of the computers 151-1 and 161-2.

Figure 2:
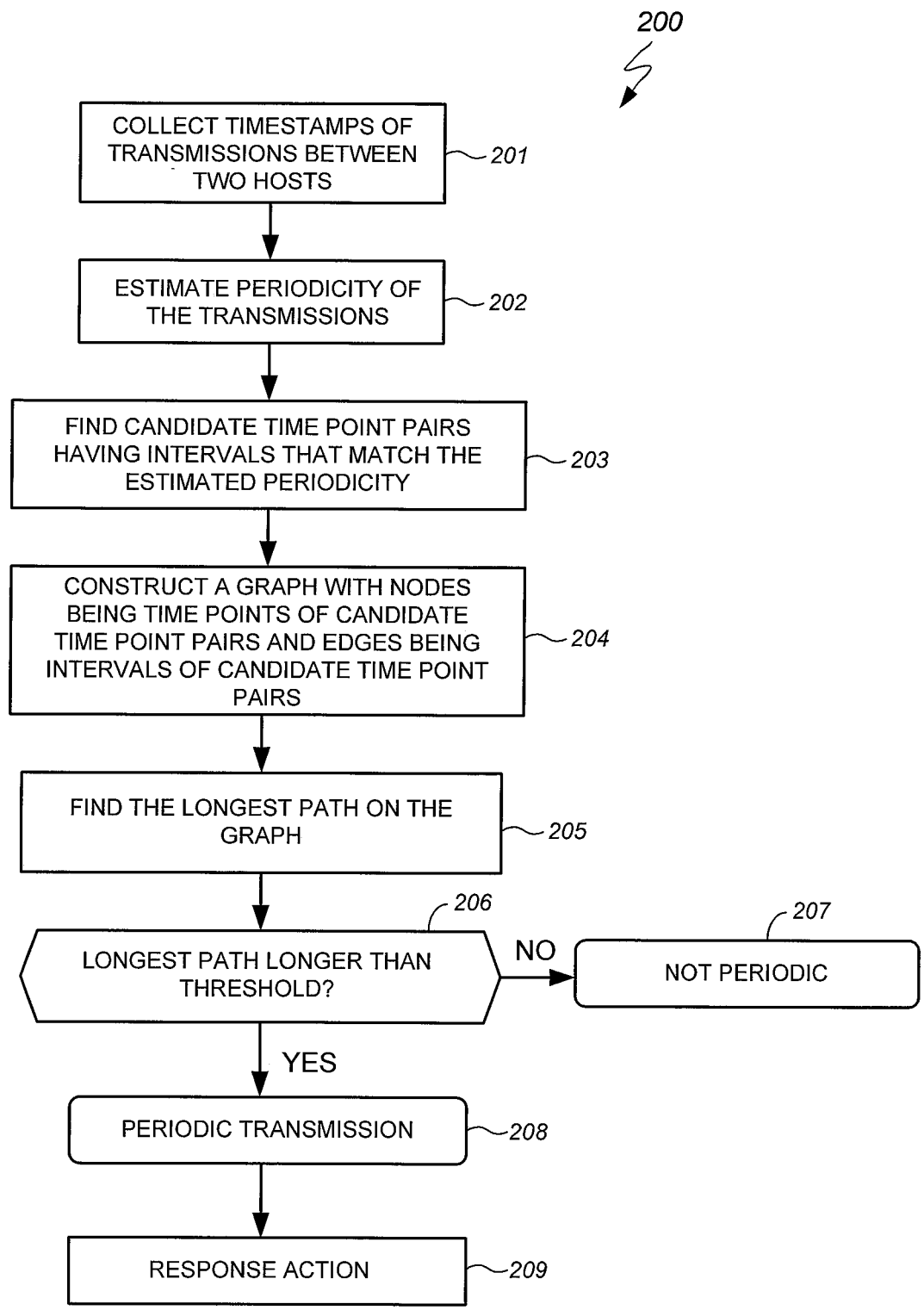
FIG. 2 shows a flow diagram of a method of detecting periodic transmissions for identifying malicious computers in accordance with an embodiment of the present invention.

FIG. 2 shows a flow diagram of a method 200 of detecting periodic transmissions for identifying malicious computers in accordance with an embodiment of the present invention. The method 200 is explained in conjunction with FIGS. 3-5. In one embodiment, the method 200 is performed by the network security device 100.

In the example of FIG. 2, timestamps of transmissions between two hosts are collected (FIG. 2, step 201). For purposes of the present disclosure, a "host" refers to a computer with associated software, such as a computer 161 or a computer 151. A timestamp indicates a time point (e.g., date and time) of when a transmission was made between the two hosts. A timestamp may be in unit of seconds, such as the number of seconds since a particular date and time in the case of UNIX operating system timestamps. The terms "timestamp" and "time point" may be used interchangeably, except that a time point recorded in a log or stamped (i.e., attached) to data is normally referred to as a "timestamp". It is to be noted that as a practical matter, two timestamps of transmissions received by the same network interface and logged by the same computer will not be the same because the network interface will receive one transmission before the other. In any case, a suitable tiebreak algorithm may be employed to arrange timestamps in chronological order.

Figure 3:
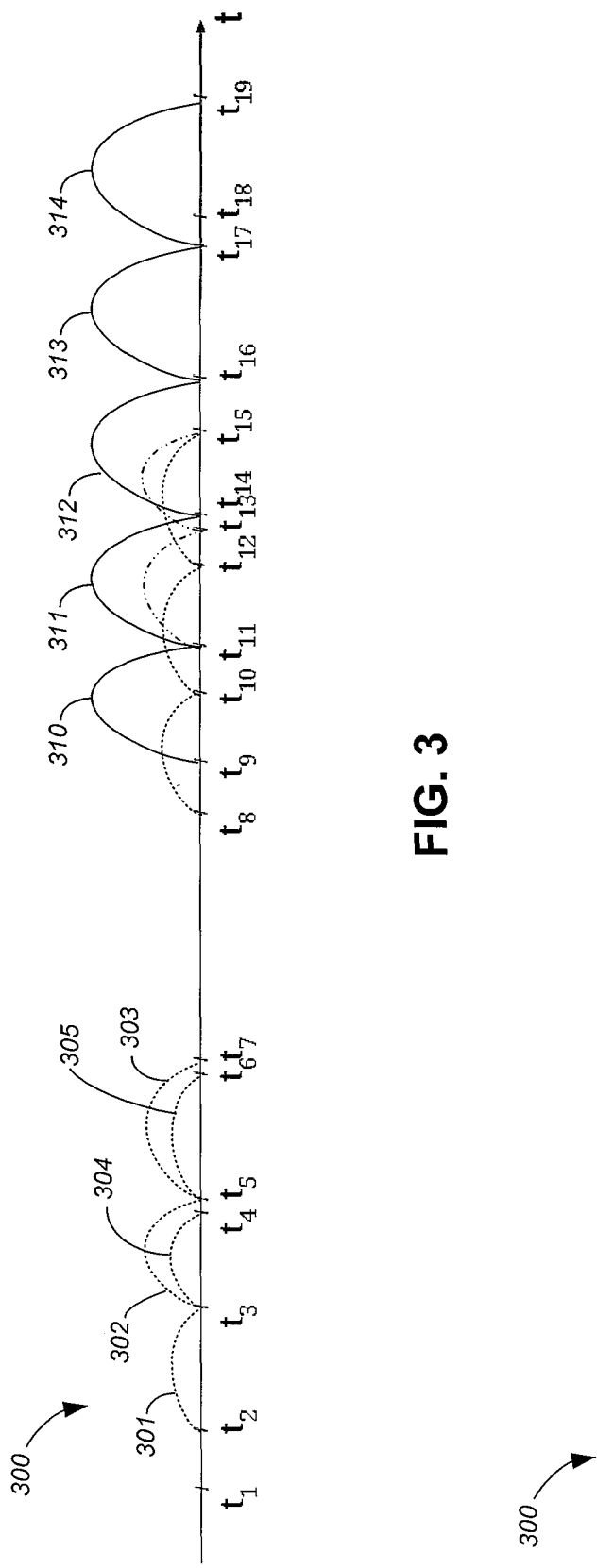
FIGS. 3 and 4 show a graph of time points in accordance with an embodiment of the present invention.
Figure 4:
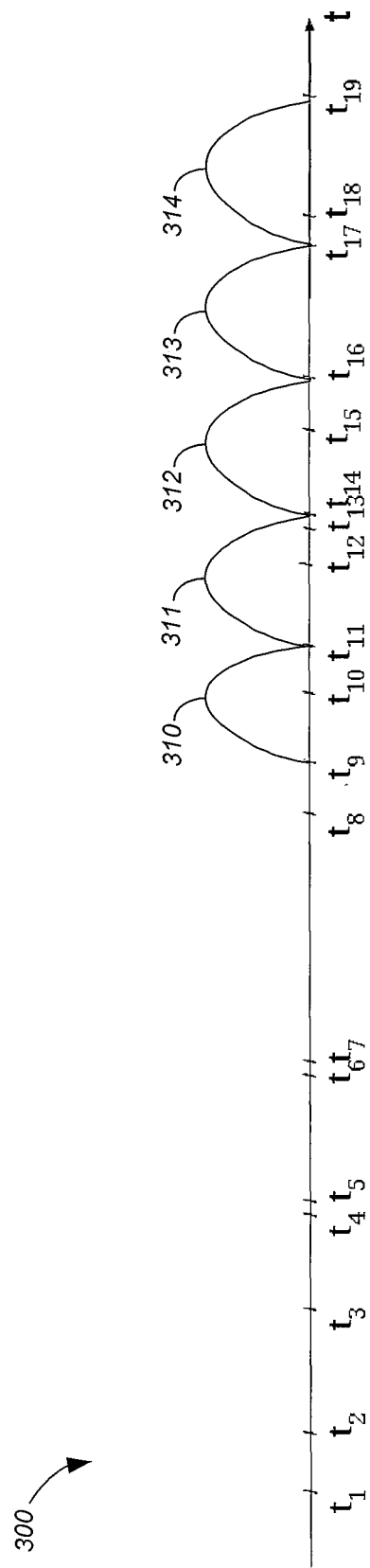

FIGS. 3 and 4 show a graph 300 of time points in accordance with an embodiment of the present invention. The horizontal axis of the graph 300 indicates time points t1, t2, t3, etc., increasing from left to right, with each time point being a timestamp entry of a transmission. For example, time point t1 is for a transmission between the two hosts at a time t1 as indicated by a corresponding timestamp, a time point t2 occurs after time point t1 and is for a transmission made between the two hosts at a time t2 as indicated by a corresponding timestamp, etc. As a particular example, the two hosts may be the computers 151-1 and 161-2, the time point t1 is the time of transmission made by the computer 161-2 to the computer 151-1, the time point t2 represents a later time of transmission made by the computer 161-2 to the computer 151-1, etc. A transmission may be a connection or session establishment, a single packet transmission, or other network communication. In one embodiment, the network communications described herein are in accordance with the Transmission Control Protocol (TCP) or User Datagram Protocol (UDP).

The length of time between a pair of time points is also referred to herein as an "interval." In the example of FIG. 3, the interval 301 is the length of time between time points t2 and t3, the interval 302 is the length of time between time points t3 and t5, the interval 303 is the length of time between time points t5 and t7, the interval 304 is the length of time between time points t3 and t4, the interval 305 is the length of time between time points t5 and t6, etc. As can be appreciated, an interval does not necessarily have to be between adjacent time points.

Continuing the example of FIG. 2, the periodicity of the transmissions between the two hosts is estimated (FIG. 2, step 202). The periodicity estimation may give, for example, that the transmissions between the two hosts are made every 60 seconds, etc. In that example, the transmissions have an estimated periodicity of 60 seconds. In one embodiment, the periodicity of transmissions may be estimated by periodogram analysis. The periodogram analysis may be performed on the time points and intervals between time points to identify frequencies of maximum power. The periodogram analysis may be performed using conventional periodogram algorithms included in standard mathematical software libraries. In one embodiment, the frequency of maximum power gives a candidate estimated periodicity.

Figure 5:
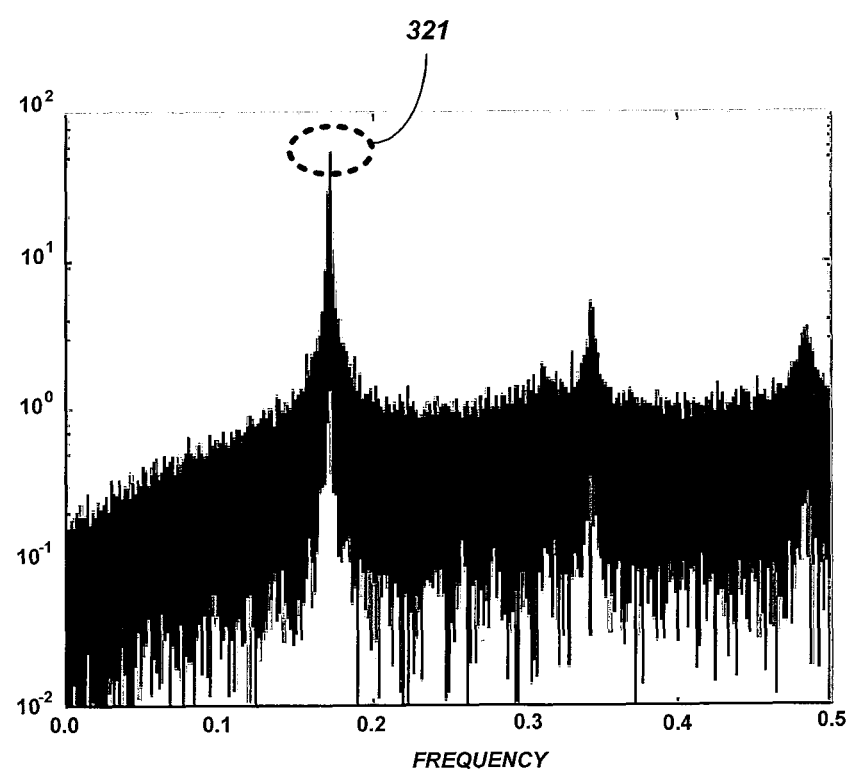
FIG. 5 shows an example periodogram graph constructed in accordance with an embodiment of the present invention.

FIG. 5 shows an example periodogram graph, resulting from performing a periodogram analysis on time points and intervals between time points. Generally speaking, periodogram analysis transforms time series data into frequency domain, where the X-axis plots all possible frequency candidates and the Y-axis gives the amount of power corresponding to a frequency. The greater the power, the more likely the corresponding frequency provides the periodicity. In the example of FIG. 5, the periodogram analysis indicates that maximum power occurs at a frequency of around 0.175 (see circle 321). In one embodiment, the estimate of periodicity is the inverse of the frequency of maximum power, which is 1/0.175 in the example of FIG. 5.

In one embodiment, some variation in the estimated periodicity is allowed to compensate for errors in the periodicity estimation, timestamps collection, varying latencies (e.g., due to hops between endpoints and collection points, due to network congestion), intentional dithering to hide from periodicity detection, and other variances. More specifically, given a calculated periodicity T and a variation δ, the estimated periodicity may be adjusted to T plus or minus δ, where δ can be a fixed value or a function of T. In the example of FIG. 2, candidate time point pairs may be found as those having an interval equal to T plus or minus δ (FIG. 2, step 203).

For purposes of the present disclosure, a candidate time point pair is a pair of time points having an interval that matches to that of a potential periodic transmission. Given time points $t_i$ and $t_j$, $t_i < t_j$, if $T-δ < t_j - t_i < T+δ$, then ($t_i$, $t_j$) gives one period or an interval of a pair of candidate time points. In the example of FIGS. 3 and 4, the time point pairs (t2, t3), (t3, t4), (t3, t5), (t5, t6), (t5, t7), (t8, t10), (t9, t11), (t10, t12), (t11, t13), (t11, t14), (t12, t15), (t13, t15), (t14, t16), (t16, t17), and (t17, t19) each has an interval that matches the estimated periodicity and are thus deemed to be candidate time point pairs, where the estimated periodicity is equal to the calculated periodicity T plus or minus variation δ.

Generally speaking, in graph theory, a graph comprises nodes that are connected by edges. In the example of FIG. 2, a time points graph is constructed with nodes being time points of candidate time point pairs and edges being intervals of the candidate time point pairs (FIG. 2, step 204). Using the time points graph 300 of FIG. 3 as an example, the time points t2-t19 (excluding t18) are time points of candidate time point pairs (t2, t3), (t3, t4), (t3, t5), (t5, t6), (t5, t7), (t8, t10), (t9, t11), (t10, t12), (t11, t13), (t11, t14), (t12, t15), (t13, t15), (t14, t16), (t16, t17), and (t17, t19). Other than time points t1 and t18, time points that are not part of a candidate time point pair are not shown in FIGS. 3 and 4 for clarity of illustration.

The example of FIG. 2 includes finding the longest path on the constructed time points graph (FIG. 2, step 205). For purposes of the present disclosure, a path is a series of continuously linked intervals on the graph. In one embodiment, the number of time points of a path is equal to the length of the path. As a particular example, in the time points graph 300 of FIG. 3, the intervals 301, 302, and 303 form a path that continuously links time points t2, t3, t5, and t7, giving a path length of three (i.e., three time intervals). Similarly, the intervals 301 and 304 form a path that continuously links time points t2, t3, and t4, giving a path length of two. In the example of FIG. 3, the intervals 310-314 form a path that continuously links the time points t9, t11, t14, t16, t17, and t19, giving a path length of five. Accordingly, the longest path length on the time points graph 300 is found to be five. For clarity of illustration, FIG. 4 shows the time points graph 300 of FIG. 3 but with only the intervals 310-314 of the longest path being labeled.

Continuing the example of FIG. 2, the longest path length is compared to a threshold length to determine if the transmissions between the two hosts are periodic (FIG. 2, step 206). The threshold length is a boundary value for identifying anomalies, and may be selected by experimentation or analysis of sample malware data. For example, the threshold length may be set to 3 to detect periodic transmissions made by malware to a C2 server. The transmissions between the two hosts may be deemed to be periodic when the longest path is longer than the threshold length (FIG. 2, step 206 to step 208). Otherwise, when the longest path is not longer than the threshold length, the transmissions are not deemed to be periodic (FIG. 2, step 206 to step 207).

Instead of using hard thresholds, paths may be ordered by path length, and the longest paths may be deemed to be high priority alerts for response action or further investigation.

A response action may be performed when the transmissions between the two hosts are deemed to be periodic (FIG. 2, step 209). In one embodiment, network communications between the two hosts are deemed to be malicious based at least on detecting the periodic transmissions between the two hosts. In that case, an alert may be raised and network communications between the two hosts may be blocked. Otherwise, no further action is required when the transmissions between the two hosts are not deemed to be periodic. In that case, network communications of the two hosts and other hosts will continue to be monitored to detect malicious network communications.

Figure 6:
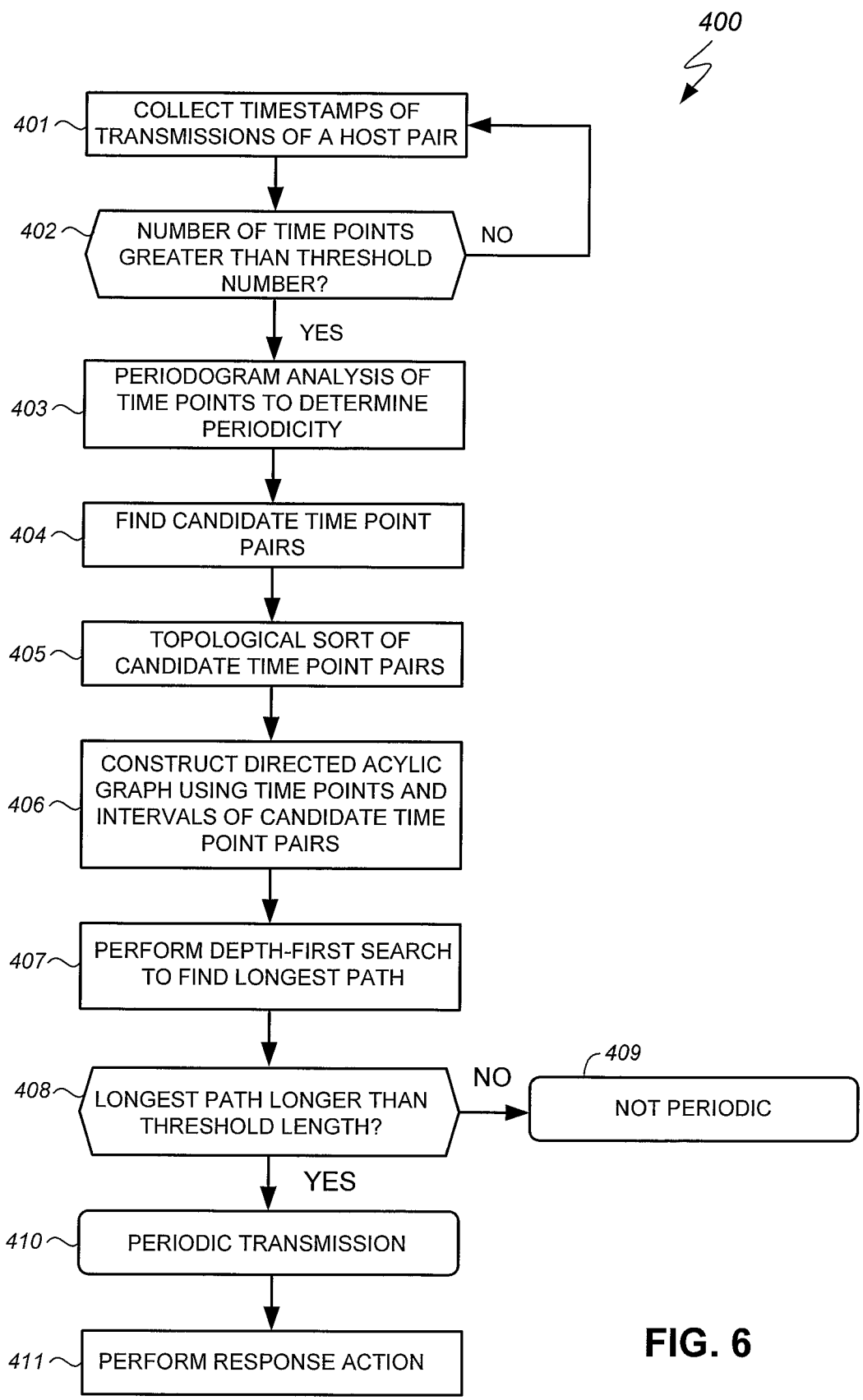
FIG. 6 shows a flow diagram of a method of detecting periodic transmissions for identifying malicious computers in accordance with an embodiment of the present invention.

FIG. 6 shows a flow diagram of a method 400 of detecting periodic transmissions for identifying malicious computers in accordance with an embodiment of the present invention. In one embodiment, the method 400 may be performed by the network security device 100.

In the example of FIG. 6, network communications on a computer network are monitored to collect timestamps of transmissions between a pair of hosts (FIG. 6, step 401). Each timestamp provides a time point of when a transmission was made, and a predetermined number of time points may need to be collected over a particular time period to meet sampling requirements, e.g., Nyquist-Shannon sampling theorem. When the number of time points available for periodicity analysis is greater than a threshold number, the method proceeds with determining whether or not transmissions between the host pair are periodic (FIG. 6, step 402 to step 403). Otherwise, when the number of time points is not greater than the threshold number, the method continues with collecting more timestamps of transmissions between the host pair (FIG. 6, step 402 to step 401).

In the example of FIG. 6, the periodicity of the transmissions between the host pair is determined by periodogram analysis (FIG. 6, step 403). The periodogram analysis yields a periodicity T that can be used in conjunction with a variation δ to find candidate time point pairs. More specifically, time point pairs having intervals equal to the periodicity T plus or minus the variation δ may be deemed to be candidate time point pairs (FIG. 6, step 404). Optionally, for performance optimization, a topological sort of the candidate time point pairs is performed to make the following graph generation more efficient. In one embodiment, the candidate time point pairs are topologically sorted in the order of the earliest time point, i.e., first element of the time point pair. That is, given $t_i < t_j$ and each time point pair is represented by ($t_i$, $t_j$), the time point pairs may be sorted by $t_i$.

In the example of FIG. 6, a directed acyclic graph (DAG) is constructed using the time points of the candidate time point pairs as nodes of the DAG and using the intervals between the candidate time points as edges of the DAG (FIG. 6, step 406). The direction of the DAG may point from an early time point to a later one, e.g. $t_i$ to $t_j$ if $t_i < t_j$.

In the example of FIG. 6, a depth-first search (DFS) algorithm is employed to find the longest path on the DAG (FIG. 6, step 407). More particularly, DFS is performed to find the longest path where n is the number of edges, i.e. time points of candidate time point pairs. The output of the method 400 at this point may include the periodicity T and the length of the longest path. As previously noted, using the example of FIG. 3, the longest path has a length of five (t9, t11, t14, t16, t17, t19) from the time point pairs (t9, t11), (t11, t14), (t14, t16), (t16, t17), and (t17, t19).

In the example of FIG. 6, the length of the longest path is compared to a threshold length (FIG. 6, step 408). The transmissions between the two hosts may be deemed to be periodic when the longest path is longer than the threshold length (FIG. 6, step 408 to step 410). Otherwise, when the longest path is not longer than the threshold length, the transmissions between the two hosts are not deemed to be periodic (FIG. 6, step 408 to step 409). A response action may be performed in response to detecting that the transmissions between the two hosts are periodic, and are thus possibly indicative of malicious network communications. Otherwise, no further action is required when the transmissions between the two hosts are not deemed to be periodic. In that case, network communications of the two hosts and other hosts will continue to be monitored to detect malicious network communications.

Figures 7, 8:
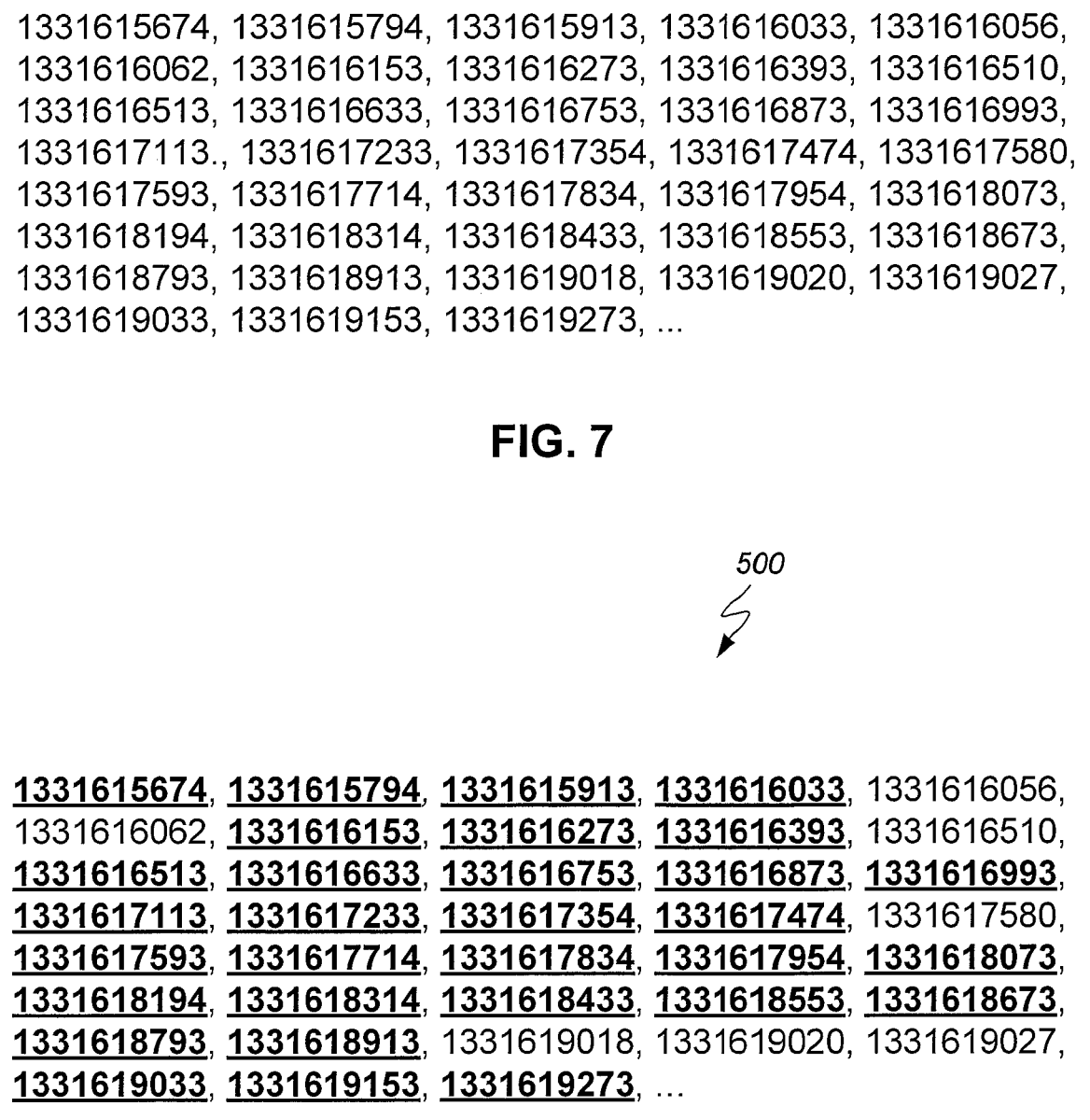

The method 400 of FIG. 6 is now further explained using the example of FIG. 7, which shows a set 500 of collected UNIX operating system timestamps. In the UNIX operating system, a timestamp is in seconds relative to a fixed predetermined date and time. As a particular example, in the set 500, the timestamp "1331615674" may represent 03/13/2012 @ 5:14 am (UTC). Each timestamp may be recorded as a log entry of a transmission.

Performing a periodogram analysis on the set 500, the frequency with maximum power is identified, with permutation filtering, to be 0.49. The frequency of maximum power is then multiplied by the time unit of 60 seconds (pre-selected bin size), which gives 120 seconds as the periodicity T.

Using the periodicity T=120 and variation $\delta$=10, edge candidates of a DAG are identified as intervals ranging from 110 seconds to 130 seconds. Time point pairs meeting the edge candidates are deemed to be candidate time point pairs. A DAG is constructed using time points of candidate time point pairs as nodes and the intervals of time point pairs as edges. A DFS algorithm is employed to find the longest path in the DAG. FIG. 8 shows the set 500, with the time points of the longest path highlighted by an underline. Time points that are not underlined are considered as noise. The method 400 provides a periodicity of 120 seconds and a path length of 30. With a threshold length of 10, the path length of 30 indicates that the transmissions are periodic.

Figure 9:
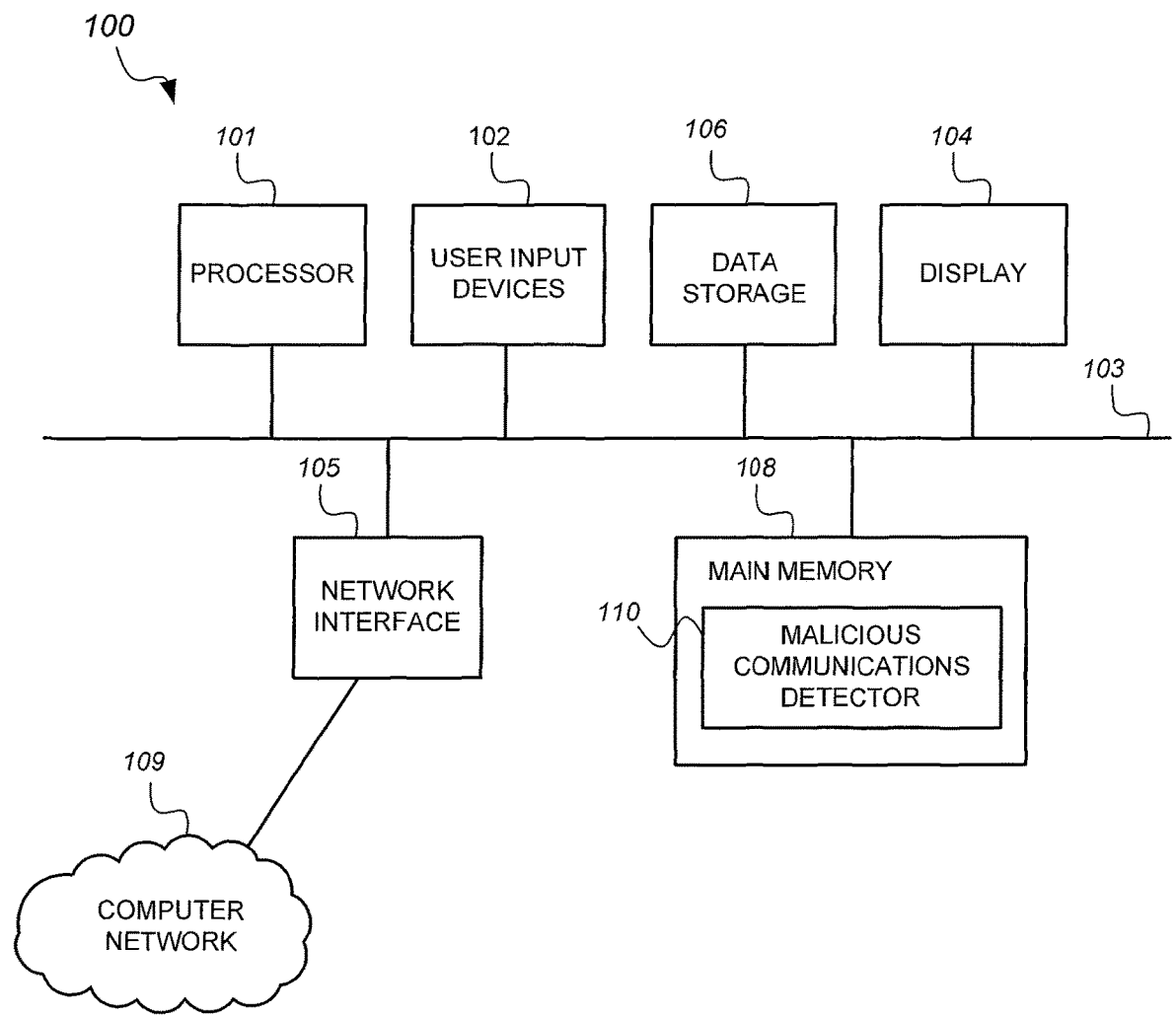
FIG. 9 shows a logical diagram of a network security device in accordance with an embodiment of the present invention.

FIG. 9 shows a logical diagram of a network security device 100 in accordance with an embodiment of the present invention. The network security device 100 may have fewer or more components to meet the needs of a particular application. The network security device 100 may include one or more processors 101. The network security device 100 may have one or more buses 103 coupling its various components. The network security device 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109.

The network security device 100 is a particular machine as programmed with one or more software modules, comprising instructions stored non-transitory on the main memory 108 for execution by the processor 101 to cause the network security device 100 to perform corresponding programmed steps. An article of manufacture may be embodied as computer-readable storage medium including instructions that when executed by the processor 101 cause the network security device 100 to be operable to perform the functions of the one or more software modules 110.

In the example of FIG. 9, the main memory 108 includes instructions of a malicious network communications detector 110. The processor 103 may execute the instructions of the detector 110 to perform the method 200 (see FIG. 2) or the method 400 (see FIG. 6). In other embodiments, the malicious communications detector is embodied in hardware, such as field programmable gate array (FPGA), application-specific integrated circuit (ASIC), or other circuit. The network security device 100 may be implemented a variety of ways without detracting from the merits of the present invention.

In light of the present disclosure, one of ordinary skill in the art will appreciate that embodiments of the present invention are generally applicable to detect many different malicious network communications. For example, transmissions made by malicious sites to attempt unauthorized logins, to post spam messages, etc. are often periodic. Embodiments of the present invention may be employed to detect these and other malicious communications.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method for detecting periodic transmissions to identify malicious computers, the method comprising:
monitoring a plurality of transmissions between a first computer and a second computer;
determining a periodicity of the plurality of transmissions, each of the plurality of transmissions occurring at a time point;
from timestamps of the plurality of transmissions, identifying candidate time point pairs having an interval that matches an estimated periodicity to within a delta threshold;
constructing a directed acyclic graph (DAG) having time points of the candidate time point pairs as nodes of the DAG and having intervals of the candidate time point pairs as edges of the DAG;
finding a longest path on the DAG that continuously links time points of the candidate time point pairs on the DAG by, at least, employing a depth-first search (DFS) algorithm;
comparing the longest path on the DAG to a threshold length; and
detecting that the plurality of transmissions is periodic and potentially malicious based at least on the longest path on the DAG being longer than the threshold length and responsively notifying an administrator or a security device.

2. The method of claim 1, wherein monitoring the plurality of transmissions between the first computer and the second computer includes collecting the timestamps of the plurality of transmissions.

3. The method of claim 1, wherein determining the periodicity of the plurality of transmissions comprises:
performing a periodogram analysis on the plurality of transmissions to generate the estimated periodicity; and
adding or subtracting a variation to the estimated periodicity.

4. The method of claim 1, wherein the first computer comprises a malicious site and the second computer has been infected by malware that sends a beaconing signal to the malicious site.

5. A system for detecting periodic transmissions to identify malicious computers, the system comprising:
- a first computer that is in communication with a second computer; and
- a network security device that is configured to monitor a plurality of transmissions between the first computer and the second computer, to determine a periodicity of the plurality of transmissions, to find candidate time point pairs of the plurality of transmissions having an interval that matches an estimated periodicity to within a delta threshold, to construct a directed acyclic graph (DAG) having time points of the candidate time point pairs as nodes of the DAG and intervals of the candidate time point pairs as edges of the DAG, to find a longest path on the DAG that continuously links one time point to another time point on the DAG by, at least, employing a depth-first search (DFS) algorithm, to detect that the plurality of transmissions is periodic based at least on the longest path being longer than a threshold length, and to perform a response action to notify an administrator or a security device in response to the plurality of transmissions being detected as periodic.

6. The system of claim 5, wherein the first computer is infected by malware and the second computer is a command and control server of the malware.

7. The system of claim 5, wherein the network security device is configured to determine the periodicity of the plurality of transmissions by performing a periodogram analysis of the plurality of transmissions to generate the estimated periodicity, and adding or subtracting a variation to the estimated periodicity.

8. The system of claim 5, wherein the response action includes blocking network communications between the first computer and the second computer.

* * * * *